United States Patent
Wright et al.

(10) Patent No.: US 11,811,713 B1
(45) Date of Patent: *Nov. 7, 2023

(54) AUDIENCE SEGMENTATION PRIORITIZATION IN SUPPORT OF PERSONALIZATION FOR AUTOMATED MESSAGE GENERATION

(71) Applicant: Truist Bank, Charlotte, NC (US)

(72) Inventors: David Wright, Roswell, GA (US); David Pham, Acworth, GA (US); Adam Thomas Lewis, Mechanicsville, VA (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,375

(22) Filed: May 13, 2022

Related U.S. Application Data

(63) Continuation of application No. 17/661,319, filed on Apr. 29, 2022.

(51) Int. Cl.
   *H04L 51/212* (2022.01)
   *H04L 51/52* (2022.01)
   *H04L 51/214* (2022.01)

(52) U.S. Cl.
   CPC .......... *H04L 51/212* (2022.05); *H04L 51/214* (2022.05); *H04L 51/52* (2022.05)

(58) Field of Classification Search
   CPC ..... H04L 51/212; H04L 51/214; H04L 51/52; G06Q 20/229
   See application file for complete search history.

(56) References Cited

U.S. PATENT DOCUMENTS

| | | | |
|---|---|---|---|
| 2014/0180919 A1* | 6/2014 | Brown | G06Q 20/1085 705/42 |
| 2017/0193543 A1* | 7/2017 | Priebatsch | G06Q 20/202 |
| 2018/0232762 A1* | 8/2018 | Greene | G06Q 30/0255 |
| 2022/0198543 A1* | 6/2022 | Jones | G06Q 20/3255 |
| 2023/0047509 A1* | 2/2023 | Dhodapkar | G06Q 20/229 |

\* cited by examiner

*Primary Examiner* — Jungwon Chang
(74) *Attorney, Agent, or Firm* — Michael A. Springs, Esq.; Shumaker, Loop & Kendrick, LLP; Patrick B. Horne

(57) ABSTRACT

A message generating system disseminates to each of multiple user devices first information items each associated with at least a respective one of multiple services made available by a first entity. When access indicative signals are received via a network connection, each prompted by a respective one of the user devices accessing at least one of the first information items, the system stores a respective awareness-stage record for each received access indicative signal, thereby recording that the respective user entity accessed at least one of the first information items. For each user entity for which a respective awareness-stage record is stored, a second item is generated and sent including information of a particular service associated with at least one first information item. User entities for which a second item was not generated are excluded as having not accessed a first item. The exclusion reduces data traffic on the network connection.

9 Claims, 7 Drawing Sheets

| Product | Awareness | Consideration | Decision | Conversion |
|---|---|---|---|---|
| Deposit | 1:1 Visits OR Campaign Impressions | 1.2+ Pages/Resource Center Articles/Landing Page Visits | Deposits App Starts & No App Completes | All Deposit App Completes (Online and Offline) |
| Checking | 1:1 Visits OR Campaign Impressions | 1.2+ Pages/Resource Center Articles/Landing Page Visits | Checking App Starts & No App Complete | Checking App Completes + Offline Checking Apps |
| Savings/MMA | 1:1 Visits OR Campaign Impressions | 1.2+ Pages/Resource Center Articles/Landing Page Visits | Savings App Starts & No App Complete | Savings App Completes + Offline Savings Apps |
| CDs | 1:1 Visits OR Campaign Impressions | 1.2+ Pages/Resource Center Articles/Landing Page Visits | CD App Starts & No App Complete | CD App Completes + Offline Apps |
| Personal Credit Card | 1:1 Visits OR Campaign Impressions | 1.2+ Pages/Resource Center Articles/Landing Page Visits | CC App Starts & No App Complete | CC App Completes + Offline Apps |
| Equity Loans | 1:1 Visits OR Campaign Impressions | 1.2+ Pages/Resource Center Articles/Landing Page Visits/Calculators/Rate Pages | Home Equity App Starts & No App Complete | Home Equity App Completes + Offline Apps |
| Lightstream | 1:1 Visits OR Campaign Impressions | 1.2+ Pages/Resource Center Articles/Landing Page Visits/Calculators/Rate Pages | CC App Starts & No App Complete | CC App Completes + Offline Apps |
| Specialty Loans | 1:1 Visits OR Campaign Impressions | 1.2+ Pages/Resource Center Articles/Landing Page Visits | Other Loan App Starts & No App Complete | Other Loan App Completes + Offline Apps |
| Business Deposits | 1:1 Visits OR Campaign Impressions | 1.2+ Pages/Resource Center Articles/Landing Page Visits | SB Dep App Starts & No App Complete | SB Dep App Completes + Offline Apps |
| Business Credit Cards | 1:1 Visits OR Campaign Impressions | 1.2+ Pages/Resource Center Articles/Landing Page Visits | SB CC App Starts & No App Complete | SB CC App Completes + Offline Apps |
| Mortgage | 1:1 Visits OR Campaign Impressions | 1.2+ Pages/Resource Center Articles/Landing Page Visits | Lead Form Visits, People Finder Visits, Smartguide Visits & No Completes, Invoca Lead Scores on Invoca or People Finder | Lead Form Completes + Smartguide Apps + Mortgage Apps |
| Wholesale | 1:1 Visits OR Campaign Impressions | 1.2+ Pages/Resource Center Articles/Landing Page Visits/Calculators | (Where Available) | NA |
| PWM | 1:1 Visits OR Campaign Impressions | 1.2+ Pages/Resource Center Articles/Landing Page Visits | Lead Forms on Invoca or People Finder (Where Available) | Offline Flag |
| Investing | 1:1 Visits OR Campaign Impressions | 1.2+ Pages/Resource Center Articles/Landing Page Visits | Lead Forms on Invoca or People Finder (Where Available) | Offline Flag |

FIG. 5

AUDIENCE SEGMENTATION PRIORITIZATION IN SUPPORT OF PERSONALIZATION FOR AUTOMATED MESSAGE GENERATION

CROSS REFERENCE TO RELATED APPLICATIONS

This application is a continuation application tracing priority to co-pending U.S. application Ser. No. 17/661,319 filed on Apr. 29, 2022, the entirety of which is herein expressly incorporated by reference.

FIELD

The present disclosure relates generally to messaging across a network, and more particularly to narrowing a user audiences into categories according to interaction levels to customize messaging and to reduce network traffic by minimizing messaging redundancies.

BACKGROUND

Interactions between potential clients and providers of products and services are increasingly conducted online or via network connections. Purchase decisions, small and large, are being made in whole or in part using computers, including mobile phones. Consumers increasingly rely on service providers to maintain records of purchases in lieu of at-home paper files. People browse for products and services on their laptop computers and on their phones, and even apply for services and products while multi-tasking, often only tentatively browsing and partially completing applications while intending to resume later with hope that their progress wasn't lost.

Providers disseminate promotional information to wide audiences, sometimes inadvertently sending redundant information to potential customers and even existing customers. Some consumers feel inundated with poorly targeted and unrestrained marketing and messaging. The associated data traffic is a burden on wireless service providers and network operators.

Improvements are needed to narrow user audiences into categories according to interaction levels to customize messaging.

BRIEF SUMMARY

According to embodiments of the invention, a message generating system uses staged user-device specific content delivery for network data-traffic reduction. The system includes a computing system including one or more processor and at least one of a memory device and a non-transitory storage device. The one or more processor executes computer-readable instructions to sequentially generate messages upon staged user-device actions. A network connection operatively connects user devices to the computing system. Upon execution of the computer-readable instructions, the computing system disseminates, to each of multiple user devices, first information items each associated with at least a respective one of multiple services made available at least in part by a first entity. The computing system further receives, via the network connection, multiple access indicative signals, each of which was prompted by a respective one of the user devices accessing at least one of the first information items. The computing system stores a respective awareness-stage record for each received access indicative signal, the respective awareness-stage record being associated with a respective user entity with which the respective one of the user devices is associated, the respective awareness-stage record thereby recording that the respective user entity accessed at least one of the first information items.

In at least one embodiment, the computing system generates, for each user entity with which a respective awareness-stage record is stored, a second information item including information of a particular service of the multiple services, the particular service being associated with at least one first information item accessed by the user entity. The computing system sends, via the network connection, each second information item to one or more device of each user entity for which the second information item was generated, excluding each of the multiple user devices not associated with any user entity for which a second information item was generated thereby reducing data traffic on the network connection. The computing system stores a respective consideration-stage record associated with each user entity to which the second information item is sent.

The computing system, in some embodiments, performs further steps, including in at least one embodiment, receiving via the network connection at least one inquiry signal prompted by one or more device of a particular user entity accessing the second information item and requesting, at least in part, the particular service; and storing a decision-stage record associated with the particular user entity thereby recording receipt of the at least one inquiry signal.

The steps, in at least one embodiment, further include generating a third information item including indicia of confirmation of providing, or determination to make accessible, the particular service to the particular user entity; and sending via the network connection the third information item to at least one device of the particular user entity for display, at least in part, of said indicia.

Disseminating the first information items may include sending at least a portion of the first information item to a third party for dissemination by the third party.

The third party may include at least one of a social-media platform operator, a social-media platform user, a media content platform, a media content provider, a website owner, and a website developer.

The steps may further include storing a conversion-stage record associated with the particular user entity to which the at least one device is send the third information.

In some examples, the computing system stores, for each one of the multiple services made available at least in part by the first entity: awareness-stage records to associate respective user entities with an awareness-stage category; consideration-stage records to associate respective user entities with an awareness-stage category; decision-stage records to associate respective user entities with a decision-stage category; and conversion-stage records to associate respective user entities with a conversion-stage category.

In some examples, the first information item is generated to guide user entities to the awareness-stage category; each second information item is generated to guide user entities to the consideration-stage category; and the third information item is generated to guide the particular user entity to receive or access the particular service.

The multiple services made available at least in part by a first entity may include at least one of banking, checking, savings, investments, credit cards, automatic-teller machines, debit cards, loans, mortgages, personal accounts, business accounts, account management, credit reporting, credit requests, and credit scores.

The first entity may be a financial institution.

According to some embodiments of the invention, a system is provided for segmenting user interactions by staged network messaging for network traffic reduction. The system may include: a computing system including one or more processor and at least one of a memory device and a non-transitory storage device, wherein said one or more processor executes computer-readable instructions to generate messages upon staged user-device actions; and a network connection operatively connecting at least one user device to the computing system. Upon execution of the computer-readable instructions, the computing system performs steps including: upon receiving a first signal prompted by at least one user device accessing a first awareness-stage data item disseminated to multiple user devices, the first awareness-stage data item associated with a first service made available by a first entity, sending via the network connection a consideration-stage item including an information request to a first user entity with which the at least one user device is associated, the information request being associated with the first service; upon at least receiving data from the user entity, the data replying at least in part to the information request, sending via the network connection the user entity a decision-stage item including prompting indicia for display on at least one device associated with the first user entity, the prompting indicia reporting a status of the information request; and disseminating a second awareness-stage data item associated with the first service to multiple user entities via respective one or more user-entity associated device, wherein disseminating the second awareness-stage data item to multiple user entities excludes the first user entity thereby reducing data traffic on the network connection.

Upon execution of the computer-readable instructions, the computing system may performs steps further comprising disseminating the first awareness-stage data item to the multiple user devices.

In some examples, disseminating the first awareness-stage data item to the multiple user devices includes sending at least a portion of the first awareness-stage data item to a third party for dissemination of the first awareness-stage data item by the third party.

The third party may include at least one of a social-media platform operator, a social-media platform user, a media content platform, a media content provider, a website owner, and a website developer.

The computing system can maintain records associating, for each of multiple services made available by a first entity, respective user entities with at least one of an awareness-stage category, a consideration-stage category, a decision-stage category, and a conversion-stage category.

Each awareness-stage data item may be generated to guide user entities to the consideration-stage category, and each consideration-stage item may be generated to guide user entities from the consideration-stage category to the decision-stage category.

In some examples, each particular user entity is provided, or is granted access to, a service for which a record associates the particular user entity with the conversion-stage category.

In some examples, each user entity associated with the conversion-stage category for a particular service is excluded from receiving awareness-stage data items and consideration-stage items for the particular service.

The multiple services made available at least in part by a first entity can include at least one of banking, checking, savings, investments, credit cards, automatic-teller machines, debit cards, loans, mortgages, personal accounts, business accounts, account management, credit reporting, credit requests, and credit scores.

The first entity may be a financial institution.

In various embodiments, a method is provided for segmenting user interactions by staged network messaging for network traffic reduction by a computing system, which includes one or more processor and at least one of a memory device and a non-transitory storage device. The computing system is operatively connected at least one user device via a network connection. The one or more processor executes computer-readable instructions to generate messages upon staged user-device actions. Upon execution of the computer-readable instructions, the computing system performs steps including: upon receiving a first signal prompted by at least one user device accessing a first awareness-stage data item disseminated to multiple user devices, the first awareness-stage data item associated with at least a first service of multiple services made available at least in part by a first entity, sending via the network connection a consideration-stage item including an information request to a first user entity with which the at least one user device is associated, the information request being associated with the first service; upon at least receiving data from the user entity, the data replying at least in part to the information request, sending via the network connection the user entity a decision-stage item including prompting indicia for display on at least one device associated with the first user entity, the prompting indicia reporting a status of the information request; and disseminating a second awareness-stage data item associated with the first service to multiple user entities via respective one or more user-entity associated devices, wherein disseminating the second awareness-stage data item to multiple user entities excludes the first user entity thereby reducing data traffic on the network connection.

In some examples, the computing system stores, for each one of the multiple services made available at least in part by the first entity: awareness-stage records to associate respective user entities with an awareness-stage category; consideration-stage records to associate respective user entities with an awareness-stage category; decision-stage records to associate respective user entities with a decision-stage category; and conversion-stage records to associate respective user entities with a conversion-stage category.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
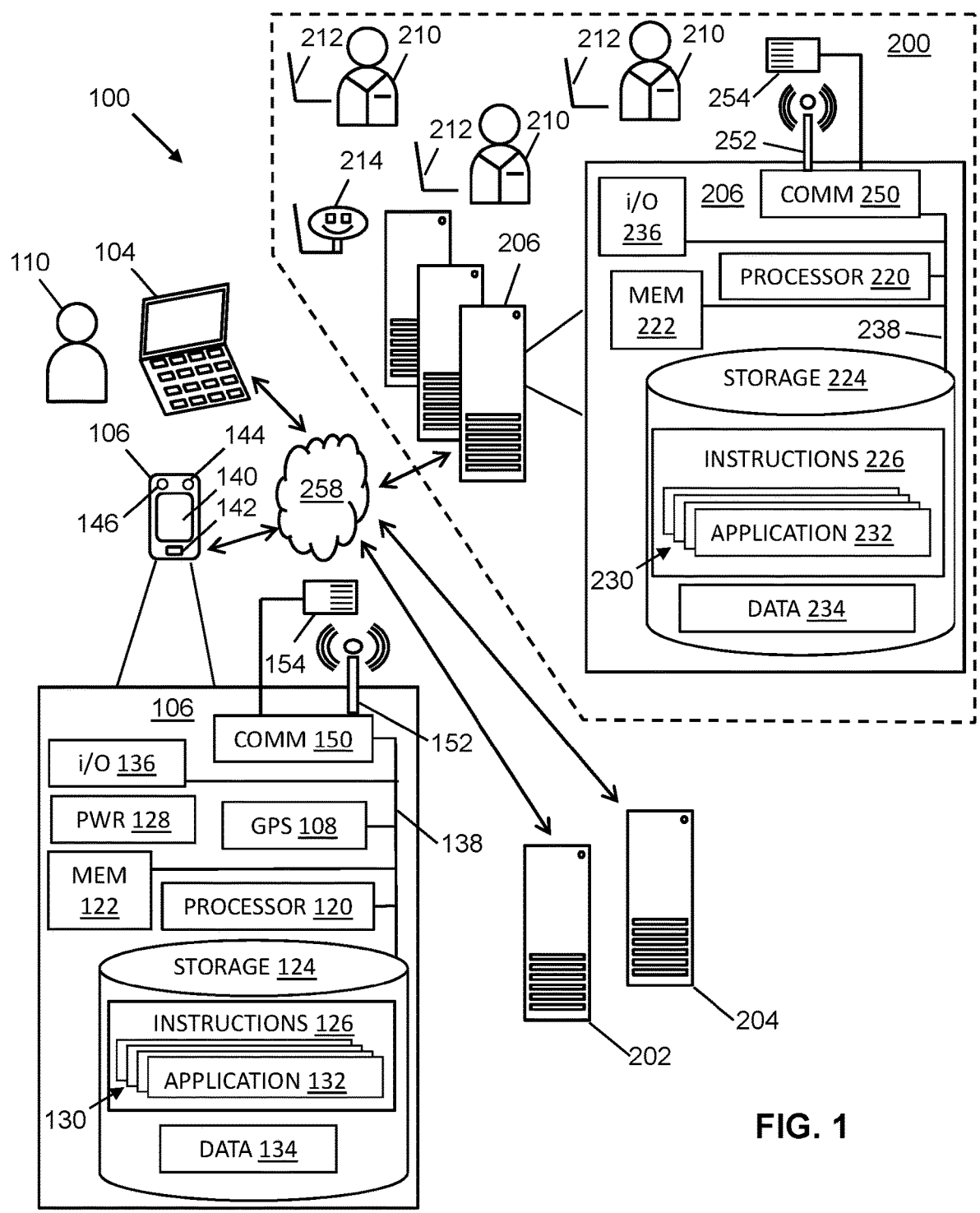

Having thus described embodiments of the invention in general terms, reference will now be made to the accompanying drawings, wherein:

FIG. 1 illustrates an enterprise system, and environment thereof, according to at least one embodiment.

Figure 2:
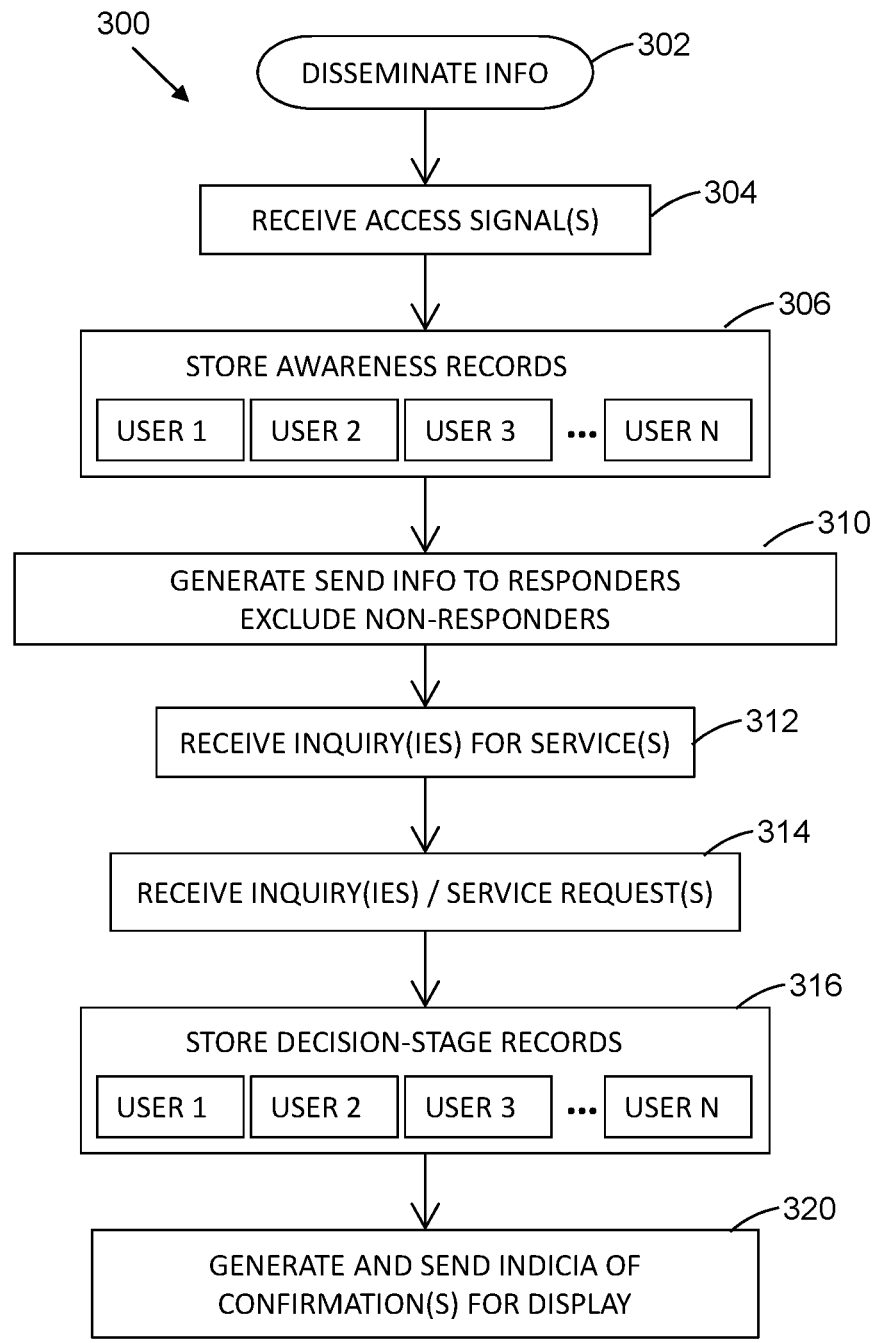

FIG. 2 is a flowchart representation of a method for segmenting user interactions by staged network messaging for network traffic reduction, according to at least one embodiment.

Figure 3:
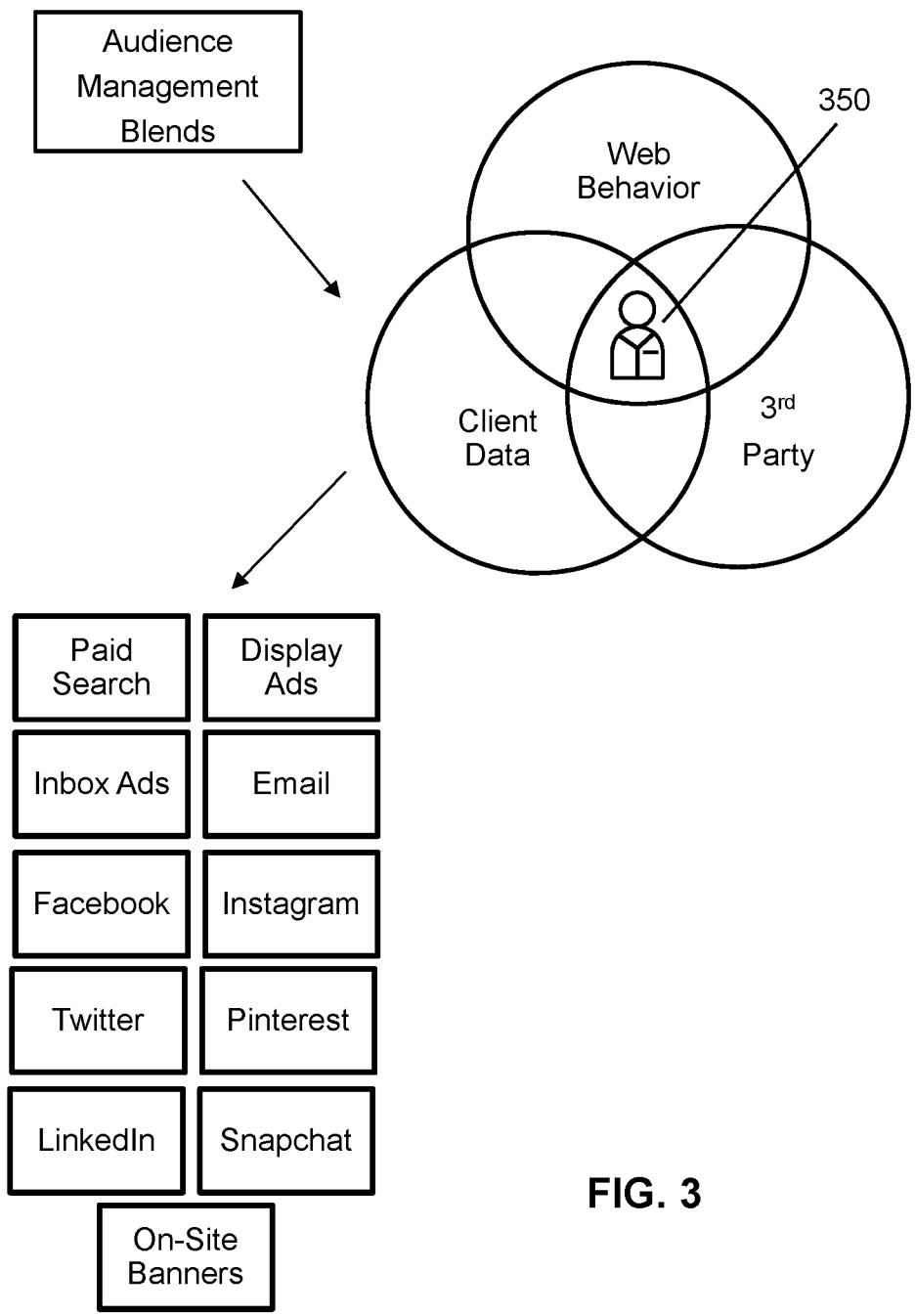

FIG. 3 is a diagram representing an example of audience management as implemented, for example, by the method of FIG. 2.

Figure 4:
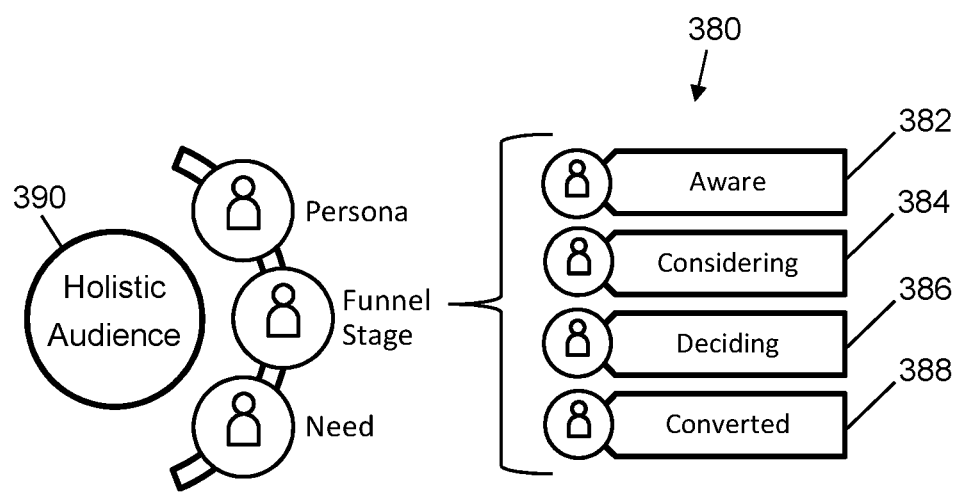

FIG. 4 illustrates category funneling in audience management by which user entities are guided into a matrix represented as a column having Awareness, Consideration, Decision, and Conversion (ACDC) categories.

FIG. 5 illustrates a 2-dimensional slice of an optionally higher-dimensional ACDC matrix, according to at least one embodiment.

Figure 6:
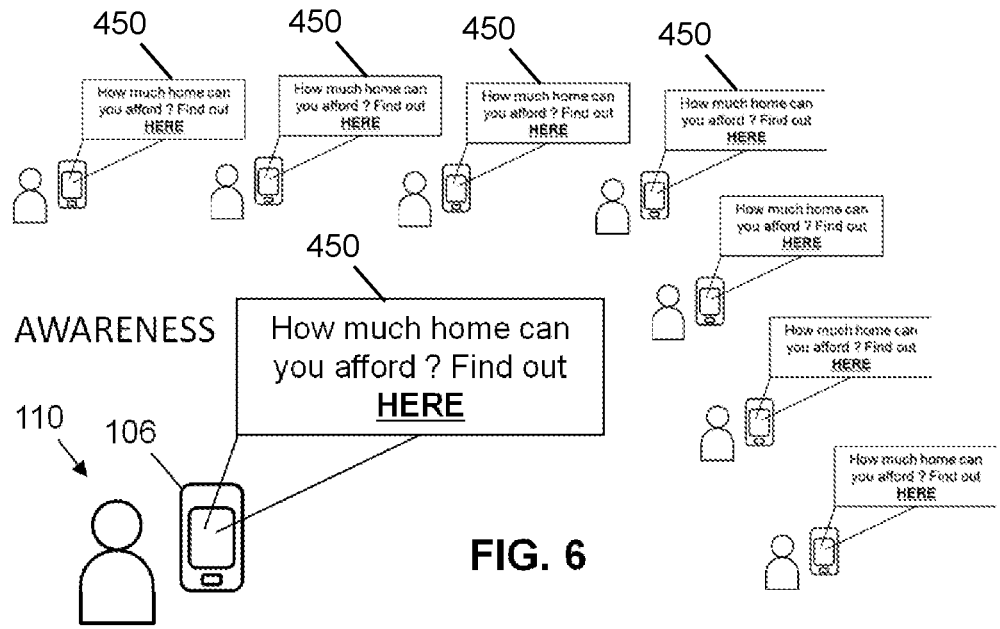
Figure 9:
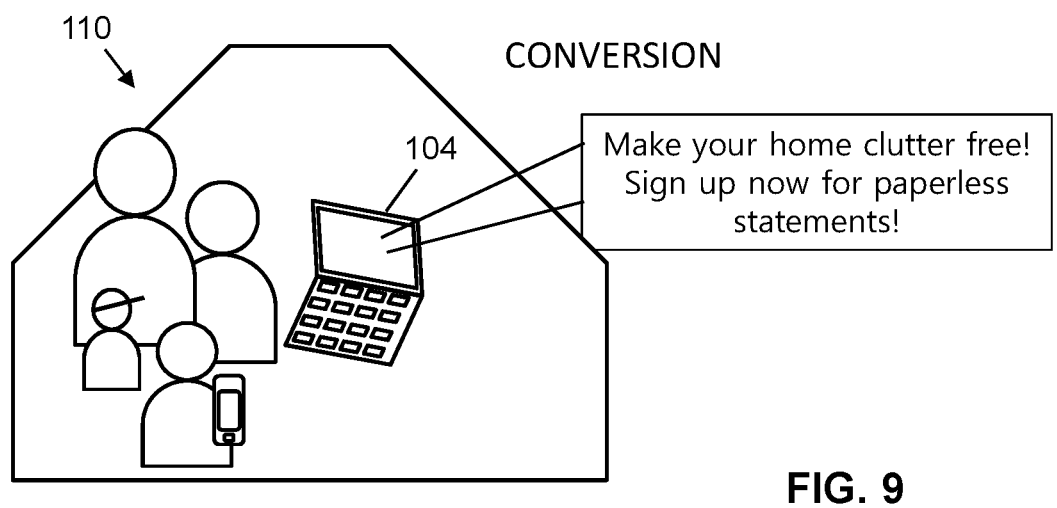

FIG. 6 illustrates an Awareness-stage event in an implementation of the method of FIG. 2 advancing toward conversion in FIG. 9.

Figure 7:
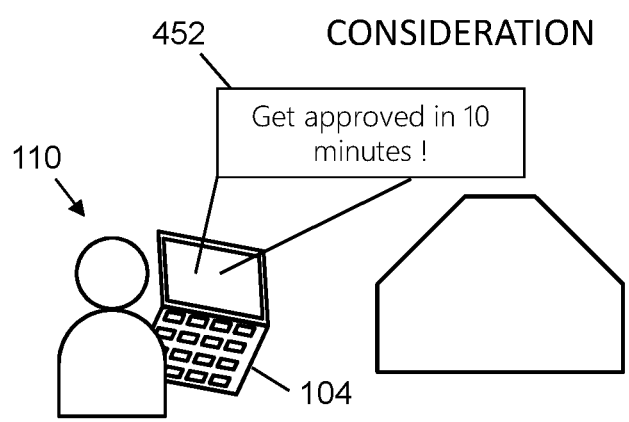

FIG. 7 illustrates a Consideration-stage event in the example of FIGS. 6-9.

Figure 8:
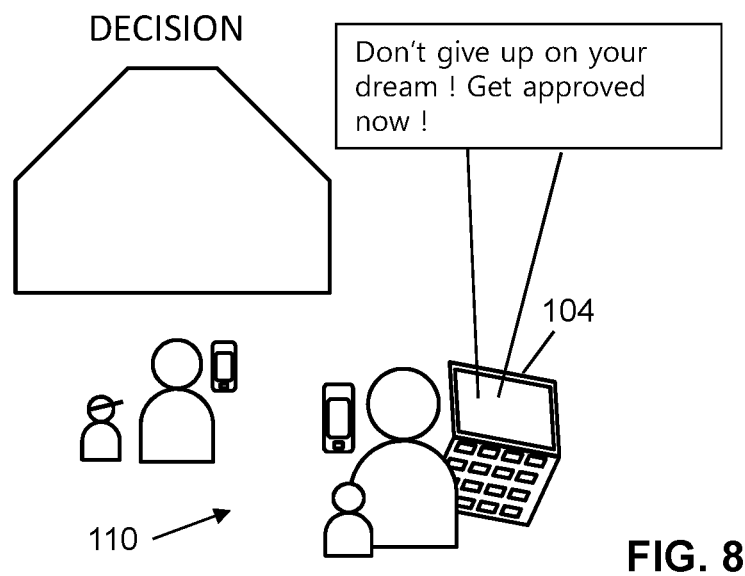

FIG. 8 illustrates a Decision-stage event in the example of FIGS. 6-9.

FIG. 9 illustrates Conversion in the example of FIGS. 6-9.

DETAILED DESCRIPTION OF EMBODIMENTS OF THE INVENTION

Embodiments of the present invention are described with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in any flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

In various embodiments, users are organized into categories and guided toward purchase considerations and decisions in staged interactions by which awareness-stage information is broadcast to a wide audience, and sequential interactions increasingly refine the recipient list for further outgoing information, inquiries, and guides. User entities, by their own continued interactions, replies, and inquiries implemented as user actions via user devices, are guided through a category funnel toward a conversion-stage category representing receipt, use, subscription, or purchase of one or more service or product by the user. The category funnel approach implemented by systems and methods described herein provides a mechanism for structuring personalization.

The narrowing nature of progress along the category funnel permits refining of the target audience of staged outgoing communications sent by an enterprise entity offering services and products for conversion. Network data traffic is thus reduced in comparison to wider casting of all stages of categorized information. Users having received certain information, such as basic promotional content with general reference to available services and products, need not redundantly receive that information after interactions with providers have evolved and, for example, requests for purchase or subscription have been made. Deepening interactions between users and providers tend to involve increasingly smaller audiences relative to the public at large according to the advantages of the systems and methods described herein, and the data trafficked across networks between users and providers is thus reduced.

From the user perspective, this advantageously personalizes interactions and empowers providers to better manage client relationships. This also conserves network resources, improves communication networks and systems efficiencies, reduces costs, and lowers energy consumption.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured to use, or be used effectively as, a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

In various embodiments, a message generating system described herein implements staged user-device specific content delivery for network data traffic reduction, for example as represented by the enterprise system 200. At least one such system according to these descriptions includes a computing system, for example as represented by the computing system 206 of FIG. 1, including one or more processor 220 and at least one of a memory device 222 and a non-transitory storage device 224. In implementing the message generation system and related methods, one or more processor executes computer-readable instructions to sequentially generate messages upon staged user-device actions. A network connection operatively connecting user devices to the computer, as represented via non-limiting examples in FIG. 1 with reference to the communication interface 250 may including the device 252, the connector 254, the network 268, and user devices 104 and 106.

Upon execution of the computer-readable instructions, the computing system performs exemplary steps, which taken together can be described as a method 300 as represented by a flowchart in FIG. 2. Step 302 includes disseminating, to each of multiple user devices, first information items each associated with at least a respective one of multiple services made available at least in part by a first entity. Step 304 includes receiving, for example via a network connection, multiple access indicative signals each prompted by a respective one of the user devices accessing at least one of the first information items. Step 306 includes storing a respective awareness-stage record for each received access indicative signal, the respective awareness-stage record being associated with a respective user entity with which the respective one of the user devices is associated, the respective awareness-stage record thereby recording that the respective user entity accessed at least one of the first information items.

Step 310 includes: generating, for each user entity with which a respective awareness-stage record is stored, a second information item including information of a particular service of the multiple services, the particular service being associated with at least one first information item accessed by the user entity and sending, via the network connection, each second information item to one or more device of each user entity for which the second information item was generated, excluding each of the multiple user devices not associated with any user entity for which a second information item was generated thereby reducing data traffic on the network connection.

Step 312 includes storing a respective consideration-stage record associated with each user entity to which the second information item is sent. Step 314 includes receiving, via the network connection, at least one inquiry signal prompted by one or more device of a particular user entity accessing the second information item and requesting, at least in part, the particular service. Step 316 includes storing a decision-stage record associated with the particular user entity thereby recording receipt of the at least one inquiry signal.

Step 320 includes: generating a third information item including indicia of confirmation of providing, or determination to make accessible, the particular service to the particular user entity; and sending via the network connection the third information item to at least one device of the particular user entity for display, at least in part, of said indicia.

FIG. 3 is a diagram representing audience management as implemented, for example, by the method 300 of FIG. 2. A first entity 350 can represent, as a non-limiting example, a service and/or product provider that operates or utilizes the enterprise system 200 of FIG. 1. In such an example, the first entity 350 can be described as an enterprise entity, a business entity, a retailer, a merchant entity, a financial institution, a bank, or other service and/or product provider. The first entity 350 can access client data held, acquired, and/or stored for example as described above with reference to FIG. 1, the storage device 224 thereof, and data 234 stored therein. The first entity 350 can also utilize available third party data that can be purchased and/or otherwise acquired, for example as described above with reference to the external systems 202 and 204 of FIG. 1. Web behavior of user entities can also be utilized by the first entity 350. This includes website behavior with regard to browsing, purchases, purchase patterns, advertising preferences, locations, and published content authored by users such as social media posts, online reviews, and other available data. The audience management systems and methods represented by FIG. 3 blend and/or augment such data to facilitate a high level of customization to approach and manage client audiences and implement the category funnel that permits refining of the target audience and guide that audience toward conversion.

With reference to both FIGS. 2 and 3, dissemination, for example at step 302, can be accomplished via: paid searches, in which search result providers boost subscribers to guide users toward subscriber websites; display ads; inbox ads; email; and various social media and networking platforms as listed in FIG. 3 as non-limiting and non-exclusive examples.

Category funneling in audience management is represented by FIG. 4, in which user entities are guided into a category matrix 380 in including sequentially staged categories including an awareness-stage category 382, a consideration-stage category 384, a decision-stage category 386, and a conversion-stage category 388. A holistic audience 390 is guided into the funnel stage with the audience management blend approach represented by FIG. 8, which takes into account, for each user entity, persona and need aspects in a full-spectrum user-oriented approach to facilitate customization, refining of the target audience, and guiding that audience toward conversion. The matrix 380 can be referenced as an ACDC matrix with reference to the Awareness, Consideration, Decision, and Conversion (ACDC) categories.

In the context of a single service or product, categorization as implemented by methods and systems described herein, can be represented as single-row representation, or a single-column column representation as in FIG. 9 with reference the one-dimensional ACDC matrix 380. FIG. 5 represents higher-dimensional ACDC matrix 400, in which multiple product/service types represented as arranged in a vertical column 402 are each assigned a marker action or trigger event for sequential advance along the ACDC categorization.

FIGS. 6-9 represent, from a user-entity perspective, the implementation of systems and methods of ACDC categorization according to these descriptions. The depicted advance through the ACDC categorization funnel is represented as a sequential or chronological advance of a particular user entity 110. In the illustrated example, the user entity 110 is represented as an individual, such as a family member, or a group, such as multiple adults in a family relationship. Such an example accommodates spousal and partnered relationships and accommodates both individuals with solo accounts with regard to banking, media, subscriptions, and profiles, and accommodates groups having joint accounts, individualized solo accounts among members, and embraces aggregate profile characteristics with reference to the full-spectrum user-oriented audience management blend approach represented by FIG. 3. For graphical representation and exemplary story-line purposes, the user entity 110 is represented as advancing toward home ownership via acquiring a mortgage loan from a financial institution, such as a bank. Other service and product examples are within the full scope of these descriptions.

In FIG. 6, as an exemplary implementation of step 302 in the method 300 of FIG. 2, a promotional first information 450 item is disseminated, for display at least in part, to each of multiple user devices. The information is associated with at least a mortgage bank loan as offered by a lender such as a bank, which can be termed as a first entity. FIG. 6 depicts the awareness-stage in the ACDC approach in that recipients have received a promotional first information item 450. FIGS. 7-9 focus on a particular user entity 110 from among many to which the promotional information was disseminated.

For each user entity that accesses the promotional first information item 450, an indicative signal reaches the first entity lender. For example as implemented by step 304 in FIG. 2, the first entity, a lender in this example, has received a signal indicating that at least the particular user entity 110 has accessed the disseminated promotional information. This may indicates that the first entity has clicked on digital advertisement, or has begun navigating into the mortgage related content in the lender's website or portal. The progress of the user entity 110 is recorded by the first entity lender, as implemented for example by step 306 in FIG. 2, in which the first entity stores an awareness stage record thereby recording at least that the user entity 110 has accessed the first promotional information item 450. FIG. 6 represents each user accessing the information item 450 as entering the funnel into the awareness-stage category of the staged ACDC sequential categories, with reference to FIG. 4.

In FIG. 7, the first entity lender has generated and sent a second information item 452, as implemented for example by step 310 in FIG. 2. The second information item deepens the interaction or engagement of the user entity 110 and the first entity lender by conveying further information about mortgage bank loan services or products associated with the first information item 450 accessed by the user entity 110 in FIG. 6. Only a single user entity 110 is shown receiving the second information item 452 in FIG. 7, illustrating that the second information is sent to those users (responders) having accessed the first information item 450, as evidenced by respective awareness stage records, with reference to step 306 in FIG. 2. Other user entities (non-reponders), for which an awareness-stage record was not recorded for failure of the first entity to receive corresponding access-indicative signals, are excluded. This narrows the audience of the second information item 452 relative to the dissemination of the first information item 450.

FIG. 7 represents the user entity advancing to the consideration stage. In the implementation of FIG. 2, the first entity lender, in step 312, stores a respective consideration-stage record associated with each user entity to which the second information item is sent. Further steps of the first entity sending information items, and the first entity receiving replies or access-indicative signals from user devices, can be included in the interaction progress represented in FIGS. 6-9 whether or not expressly illustrated and described. For example, an online calculator or other tool may be provided by the first entity for use by the user entity to determine mortgage rates, amortized payments, pay-off amounts, and other quantities and metrics. In the illustrated example, the user entity applies for, and acquires a mortgage loan. Thus a thorough application process is represented by a few exemplary illustrations with reference to FIGS. 6-9, and a few exemplary steps with reference to the method 300 as represented by a flowchart in FIG. 2.

The user entity 110 is illustrated as accessing the disseminated promotional first information item 450 via a mobile device 106 and thereby advancing into the awareness stage. The user entity 110 is illustrated as accessing the second information item 452 via a computing device 104 in FIG. 7. The user can utilize any owned or accessible devices, and may prefer a laptop or other personal computer in lieu of a mobile phone when browsing detailed information and when completing an application for service, such as a loan application for a mortgage loan. These descriptions embrace that flexibility and/or user choice by use of such terms as one or more device of each user entity or associated with a user entity. Ultimately, the user entity is the audience of information provided by the first entity lender in the interaction progress represented in FIGS. 6-9, whereas the user devices are the targets for digital promotional content, files, and inquiries for further data by which the illustrated mortgage application process is implemented. In that sense, information can be described as sent or intended for the user entity or user device, without necessitating one device of the user over another.

FIG. 8 represents the user entity advancing to the decision stage. With additional reference to steps 314 of FIG. 2, in which the first entity receives inquiry signal(s) prompted by a user device of the user entity 110 accessing the second information item 452 and the user entity requesting, at least in part, the particular service or product. In the example illustrated in FIGS. 6-9, the particular service or product is a mortgage loan. In the decision stage at least in the mortgage example, an application process has at least begun. In the illustrated example of FIG. 8, the first user entity 110 is encouraged to complete an application process and advance toward conversion.

FIG. 9 represents the user entity advancing to the conversion stage, in which a mortgage loan has been acquired and a home purchased in the illustrated example. Additional messaging from the first entity lender to the first user entity 110 is conducted aware of the conversion-stage category of the particular first user entity 110, for example utilizing the ACDC matrix 400 or similar data object. A user having acquired, for example, a recent mortgage, need not receive basic promotional content for the same or similar product or service. A user in a conversion category with regard to a mortgage, however, may benefit from receiving widely disseminated awareness-stage information for other products and services. For example, a user in a mortgage conversion category may be eventually be interested in refinancing and can be guided to the entry of the funnel approach by appropriate messaging.

Progress along the category funnel permits narrowing of target audiences, from wide user groups for basic disseminated information such as brand awareness advertising and basic introductions to the range of products and services a provider may offer, to smaller targeted groups. Thus, according to systems and methods described herein, interactions between a provider and existing or potential clients can be increasingly personalized. From a wider public perspective, the narrowing nature of the process of funneling entities and interactions into staged categories reduces data trafficked across networks, conserving network resource to improves communication networks and systems efficiencies, to minimize latencies and needless redundancies, to reduce costs, and to lower energy consumption.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A message generating system using staged user-device specific content delivery for network data traffic reduction, the system comprising:
    a computing system including one or more processor and at least one of a memory device and a non-transitory storage device, wherein said one or more processor executes computer-readable instructions to sequentially generate messages upon staged user-device actions; and
    a network connection operatively connecting user devices to the computing system,
    wherein, upon execution of the computer-readable instructions, the computing system performs steps comprising:
        disseminating to each of multiple user devices first information items each associated with at least a respective one of multiple services made available at least in part by a first entity;
        storing a respective awareness-stage record for each of a plurality of received access indicative signals, the respective awareness-stage record being associated with a respective user entity with which the respective one of the user devices is associated, the respective awareness-stage record thereby recording that the respective user entity accessed at least one of the first information items;
        generating, for each user entity with which a respective awareness-stage record is stored, a second information item including information of a particular service of the multiple services, the particular service being associated with at least one first information item accessed by the user entity;
        sending, via the network connection, each second information item to one or more device of each user entity for which the second information item was generated, excluding each of the multiple user devices not associated with any user entity for which a second information item was generated thereby reducing data traffic on the network connection;
        storing a respective consideration-stage record associated with each user entity to which the second information item is sent;
        receiving via the network connection at least one inquiry signal prompted by one or more device of a particular user entity accessing the second information item and requesting, at least in part, the particular service;
        storing a decision-stage record associated with the particular user entity thereby recording receipt of the at least one inquiry signal;
        generating a third information item including indicia of confirmation of providing, or determination to make accessible, the particular service to the particular user entity; and
        sending via the network connection the third information item to at least one device of the particular user entity for display, at least in part, of said indicia.

2. The message generating system of claim 1, wherein, upon execution of the computer-readable instructions, the computing system further performs steps comprising:
    receiving via the network connection the plurality of received access indicative signals each prompted by a respective one of the user devices accessing at least one of the first information items.

3. The message generating system of claim 2, wherein disseminating to each of multiple user devices the first information items comprises sending at least a portion of the first information item to a third party for dissemination of the first information item by the third party.

4. The message generating system of claim 3, wherein the third party comprises at least one of a social-media platform operator, a social-media platform user, a media content platform, a media content provider, a website owner, and a website developer.

5. The message generating system of claim 2, wherein upon execution of the computer-readable instructions, the computing system performs steps further comprising storing a conversion-stage record associated with the particular user entity to which the at least one device is send the third information.

6. The message generating system of claim 5, wherein the computing system stores, for each one of the multiple services made available at least in part by the first entity:
    awareness-stage records to associate respective user entities with an awareness-stage category;
    consideration-stage records to associate respective user entities with an awareness-stage category;
    decision-stage records to associate respective user entities with a decision-stage category; and
    conversion-stage records to associate respective user entities with a conversion-stage category.

7. The message generating system of claim 6, wherein:
    the first information item is generated to guide user entities to the awareness-stage category;
    each second information item is generated to guide user entities to the consideration-stage category; and
    the third information item is generated to guide the particular user entity to receive or access the particular service.

8. The message generating system of claim 2, wherein the multiple services made available at least in part by a first entity comprise at least one of banking, checking, savings, investments, credit cards, automatic-teller machines, debit cards, loans, mortgages, personal accounts, business accounts, account management, credit reporting, credit requests, and credit scores.

9. The message generating system of claim 2, wherein the first entity comprises a financial institution.

\* \* \* \* \*